(12) United States Patent
Alause et al.

(10) Patent No.: US 6,520,015 B1
(45) Date of Patent: Feb. 18, 2003

(54) TUNING FORK GYROSCOPE

(75) Inventors: Hélène Wehbe Alause, Grenoble (FR); Fabien Formosa, Marigny les Usages (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/831,897

(22) PCT Filed: Sep. 26, 2000

(86) PCT No.: PCT/FR00/02655
§ 371 (c)(1),
(2), (4) Date: May 24, 2001

(87) PCT Pub. No.: WO01/23838
PCT Pub. Date: Apr. 5, 2001

(30) Foreign Application Priority Data

Sep. 28, 1999 (FR) .............................. 99 12070

(51) Int. Cl.⁷ ................................. G01P 3/00
(52) U.S. Cl. ......................................... 73/497
(58) Field of Search ................ 73/50.16, 509, 73/497, 504.02

(56) References Cited

U.S. PATENT DOCUMENTS 5,780,739 A    7/1998   Kang et al.

FOREIGN PATENT DOCUMENTS

| DE | 195 00 800 | 12/1995 |
| DE | 44 30 439 | 6/1996 |
| EP | 0 664 438 | 7/1995 |
| EP | 0 915 323 | 5/1999 |

*Primary Examiner*—Richard A. Moller
(74) *Attorney, Agent, or Firm*—Oblon, Spivak, McClelland, Maier & Neustadt, P.C.

(57) ABSTRACT

Diapason type gyrometers using a micro-mechanical structure of vibrating beams. The gyrometer includes a micro-machined sensitive element with at least two symmetrically positioned excitation beams on each side of and parallel to a sensitive Oy axis of the gyrometer. The two beams are connected at their ends through at least one transverse element fixed in its central part to the sensitive Oy axis, to a frame through an elastic torsion return element acting in opposition to the rotation of the transverse element about the Oy axis. The elastic return elements are sized such that the variation of their resonant natural frequency in torsion with temperature is similar to the variation of the resonant natural frequency in bending of the beams with temperature. Such a device may find particular application in the measurement of the angular velocity of a mobile.

14 Claims, 7 Drawing Sheets

TUNING FORK GYROSCOPE

BACKGROUND OF THE INVENTION

1. Field of the Invention

The invention relates to machined micro-mechanisms comprising return elements in the form of beams subjected to simultaneous bending and torsion deformations. More precisely, the invention relates to diapason type gyrometers using a micro-mechanical structure of vibrating beams.

2. Description of the Related Art

In some machined micro-mechanisms, it is sometimes necessary to have resonance modes in translation and other resonance modes in rotation simultaneously. The sensitive element of a diapason gyrometer is one of these micro-mechanisms.

FIG. 1 shows a simplified drawing of a sensitive micro-machined element 10 of a diapason type gyrometer with a symmetrical double beam structure. The sensitive element has two degrees of freedom about the Ox and Oz axes perpendicular to a reference coordinate system Oxyz. The purpose of the gyrometer is to measure the angular velocity $\Omega$ of the reference Oxz rotating about the Oy axis perpendicular to this reference.

The sensitive element of the gyrometer comprises a first pair of two excitation beams 12 and 14, and a second pair of two other excitation beams 16 and 18. The excitation beams in the first pair and the second pair are located in the same Oxy plane of the reference coordinate system and are parallel to a sensitive axis YY' coincident with the Oy axis. The first and the second pairs are located on opposite sides of the YY' axis and at approximately equal distances from it.

Each pair of excitation beams comprises a central mass connecting the two beams in the pair at their center, a mass m1 at the middle of the first pair and a mass m2 at the middle of the second pair.

The ends of the beams 12, 14, 16, 18 located on one side are connected to a first transverse element 20 and to a second transverse element 22 located in the same Oxy plane as the excitation beams and approximately perpendicular to these beams.

The first 20 and second 22 transverse elements comprise a first return beam 24 and a second return beam 26 (or return element) respectively, that have torsion axes collinear with the sensitive axis YY' of the gyrometer. The ends of the first and the second return beams are connected to a first frame 28 and a second frame 30 respectively, rigidly fixed to the gyrometer.

In order to measure the angular velocity during one rotation of the gyrometer, an electrostatic device 32 creates deliberate excitations E1 and E2 respectively on masses m1 and m2 respectively at the resonant natural frequency of the excitation beams and the return beams. These excitation forces E1 and E2 have the same amplitude but opposite directions, and are applied to masses m1 and m2 parallel to an XX' axis coincident with the Ox axis of the reference coordinate system. The excitations E1 and E2 produce displacements of masses m1 and m2 in two opposite directions at instantaneous velocities v1 and v2 respectively. One rotation of the gyrometer with a sensitive element 10 subject to excitations E1 and E2 produces a pair of Coriolis forces F1 and F2 about the sensitive axis YY' on masses m1 and m2 respectively, causing a rotation of the transverse elements 20, 22 and torsion of the return beams 24 and 26 about this axis.

The angular rotation velocity $\Omega$ of the sensitive element 10 is determined by a measurement of the position of masses m1 and m2. The Coriolis moment at masses m1 and m2 is calculated as follows:

$$Mcor/_y = \frac{d}{dt}(J \cdot \Omega)$$

where $J \approx J_0 + J_1 \sin \omega t$

Mcor/$_y$: Coriolis moment applied on masses m1 and m2;
$\Omega$: angular velocity of the sensitive element 10 about the sensitive axis YY';
$\omega$: natural angular frequency of masses m1 and m2;
J: moment of inertia of masses m1 and m2 about the YY' axis;
Jo: constant part of the moment of inertia J;
$J_1$: oscillating part of the moment of inertia generated by movement of the masses about the XX' axis at the natural angular frequency $\omega$.

The positions of the masses m1 and m2 are calculated by capacitive effect, and the angular velocity $\Omega$ of the gyrometer is calculated using known methods making use of the masses m1 and m2 and the torsion and the bending constants of the beams of the sensitive element.

Coriolis forces exerted on the element during one rotation of the gyrometer create a torsion in the return elements at the oscillation frequency of the excitation, while the deliberate excitation of masses m1 and m2 causes bending of the excitation beams.

The resulting bending force and amplitude of bending on a beam are related to each other by Young's modulus for the material used, while the torsion forces and the resulting torsion angle for the same material are related by Poisson's ratio for the mechanical behavior that varies depending on the geometry of the beam subjected to torsion.

In gyrometers according to known practice, an attempt is made to make two systems of beams (excitation beams and detection beams) that have the closest possible resonant natural frequencies to amplify the two movements (the excitation vibration movement and the detection vibration movement) produced by the Coriolis force on the sensitive element 10. On gyrometers according to known practice, the excitation vibration takes place on a bending mode, whereas the detection vibration takes place on a torsion mode.

These two resonance modes have different behaviors in terms of frequency variation as a function of beam machining uncertainties: the stiffness of a beam with a rectangular cross-section in bending depends mainly on its thickness and length, whereas the stiffness in torsion depends mainly on the thickness and the width. The two types of stiffness are expressed by:

Stiffness in bending: Kbending proportional to $E.W.(H^3/L^3)$

Stiffness in torsion: Ktorsion proportional to $[E./2(1-v)].W^3.H^3/[L.(W^2+H^2)]$ where L, W, and H are the length, width and depth of the beams, E and v are the Young's modulus and the Poisson's ratio for the material.

as a function of the temperature: the bending mode being related only to the Young's modulus for the material, while the torsion is dependent on Young's modulus and Poisson's ratio; these two parameters do not have the same thermal behavior and therefore do not vary in the same way to temperature fluctuations applied to the gyrometer.

These disadvantages cause a change in the resonant frequencies between beams operating in different modes (bending and torsion), that limit the performance and stability of the gyrometers.

SUMMARY OF THE INVENTION

In order to overcome the disadvantages of angular velocity measurement systems according to prior art, the invention proposes m gyrometer comprising a micro-machined sensitive element with at least two symmetrically positioned excitation beams on each side of and parallel to a sensitive Oy axis of the gyrometer, excited in bending about an Ox axis perpendicular to the sensitive Oy axis, and connected through their ends to at least one transverse element fixed in its central part to the sensitive Oy axis, to a frame through an elastic torsion return element acting in opposition to the rotation of the transverse element about the Oy axis, characterized in that elastic return element(s) are sized such that the variation of their resonant natural frequency in torsion with temperature is similar to the variation of the resonant natural frequency in bending of the beams with temperature.

According to a first embodiment of the gyrometer according to the invention, the elastic return element of a transverse element comprises at least one beam elongated in a direction perpendicular to the Oy axis such that the torsion return force due to this elastic return element is essentially due to the resistance of this elongated beam to bending.

In a second embodiment of the gyrometer according to the invention, the elastic return element comprises two elongated beams approximately parallel to each other and attached to each other at their ends on the same side, the central part of one of the beams being attached to the transverse element and the central part of the other beam being attached to the central part of the frame.

In another embodiment of the gyrometer according to the invention, the elastic return element comprises three approximately parallel elongated beams, a first beam attached through one of its end to the transverse element, a second beam attached through one of its ends to the frame, and a third beam attached through one of its ends to the other end of the first beam and through its other end to the other end of the second beam.

In these embodiments according to the invention, the various return elements are subject to forces that essentially produce deformations in bending and very small deformations in torsion, unlike machined micro-mechanical devices according to prior art (sensitive element 10 in FIG. 1) comprising excitation beams subjected to forces causing deformation by bending and return beams subjected to forces causing deformation by torsion (rotation torque about the YY' sensitive axis).

During vibrational excitation of excitation beams of the sensitive element 10 in FIG. 1, the resonant frequencies of beams deformed in bending and beams deformed in torsion are expressed differently, and in this case the dimensions of the excitation beams and the return beams will be very different if it is required to make these beams vibrate at the same resonant frequency. The return beam to which torsion forces are applied will be shorter than the excitation beam to which bending forces are applied.

The geometric manufacturing uncertainties affect these two resonance modes very differently (in bending and in torsion) and it is difficult to obtain two superposed resonant frequencies. Furthermore in the sensitive element 10 in FIG. 1, the return beam has a rectangular section instead of a round section, therefore the torsion mode is not pure and consequently is difficult to predict precisely. Finally, the frequencies of the torsion and bending modes do not vary with temperature in the same way, possibly creating thermal instabilities in resonance.

Another disadvantage of the sensitive element 10 in FIG. 1 is the appearance of a shift between resonant natural frequencies of the excitation beams and return beams due to manufacturing dispersions. The same geometric variation in the excitation beams and in the return beams will modify the corresponding natural frequencies in bending and torsion differently.

In the micro-mechanical device according to the invention machined from the same material (normally silicon), the elongated beams are essentially subjected to bending forces and therefore deformations are determined as a function of the Young's modulus. The attachments of the elongated beams of a return element are composed of beams that are short in the direction of the Oy sensitive axis in order to have good resistance to torsion.

BRIEF DESCRIPTION OF THE DRAWINGS

Other characteristics of the invention will become clear after reading the detailed description of the following embodiments with reference to the attached drawings in which:

FIG. 3b shows a top view along AA' of the partial view in FIG. 3a.

FIG. 5b shows a bottom view along BB' of the partial view in FIG. 5a.

DETAILED DESCRIPTION OF THE PREFERRED EMBODIMENTS

Figure 1:
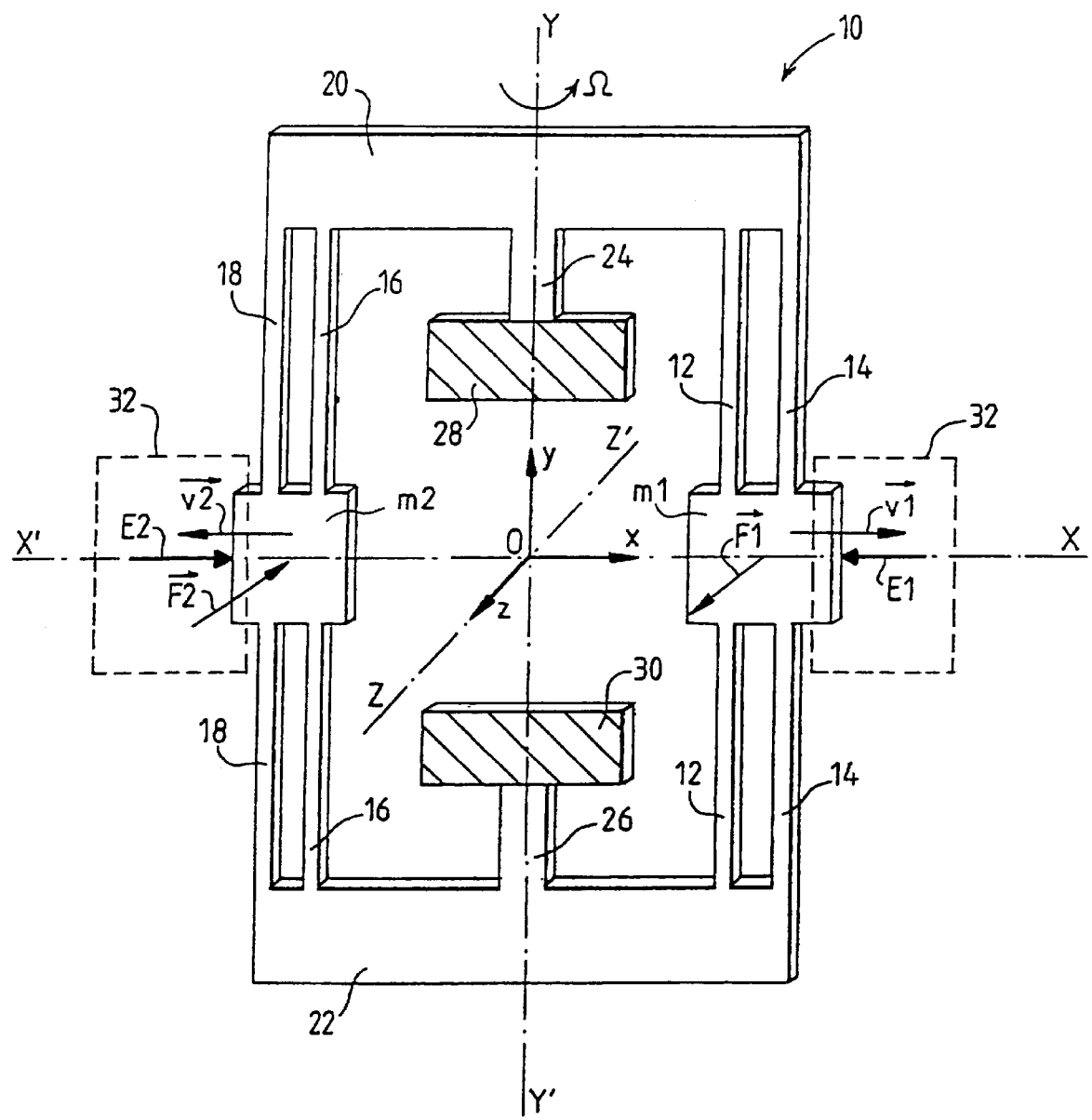
FIG. 1, already described, shows a simplified drawing of the sensitive element 10 of a diapason gyrometer according to prior art.
Figure 2:
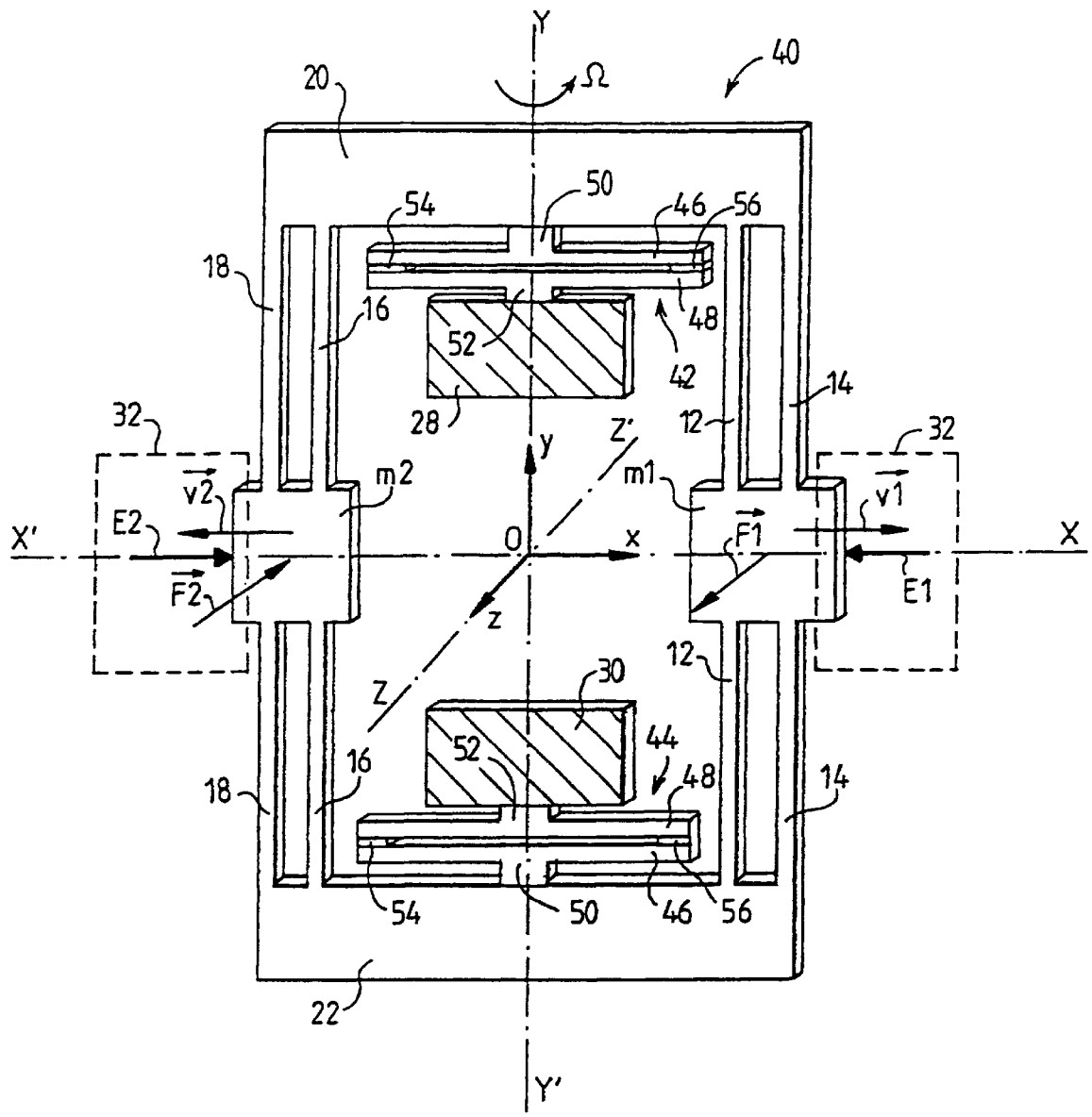
FIG. 2 shows a first embodiment of the sensitive element of a diapason gyrometer according to the invention.

FIG. 2 shows a first embodiment of a sensitive element 40 of a diapason gyrometer according to the invention with a sensitive element comprising two transverse elements, a first transverse element connecting the ends of the excitation beams located on the same side and a second transverse element connecting the other ends of these same excitation beams. The sensitive element 40 has a symmetric double beam structure like that of the sensitive element 10 shown in FIG. 1.

The sensitive element 40 of the gyrometer comprises the first pair of two excitation beams 12 and 14 and the second pair of two other excitation beams 16 and 18. The excitation beams of the first and second pairs are located in the same Oxy plane of the reference coordinate system and are parallel to a YY' sensitive axis coincident with the Oy axis. The first and second pairs are located on each side and at approximately equal distances from the YY' axis.

Each pair of excitation beams comprises a central mass connecting the two beams of one pair at their middle, the mass m1 at the middle of the first pair and the mass m2 at the middle of the second pair The ends of the beams 12, 14, 16, 18 located on the same side are connected to the first transverse element 20 and to the second transverse element 22 located in the same Oxy plane of the excitation beams and approximately perpendicular to these beams.

The first transverse element 20 and the second transverse element 22 are attached to a first element 42 and a second element 44 of a torsion return element, each of the elastic return elements comprising a first elongated beam 46 and a second elongated beam 48 along a direction perpendicular to the sensitive axis TT', a first elongated beam 46 being attached to a transverse element and a second elongated beam 48 being attached to a frame, the first and second elongated beams being attached to each other through its ends on the same side.

Figure 3A:
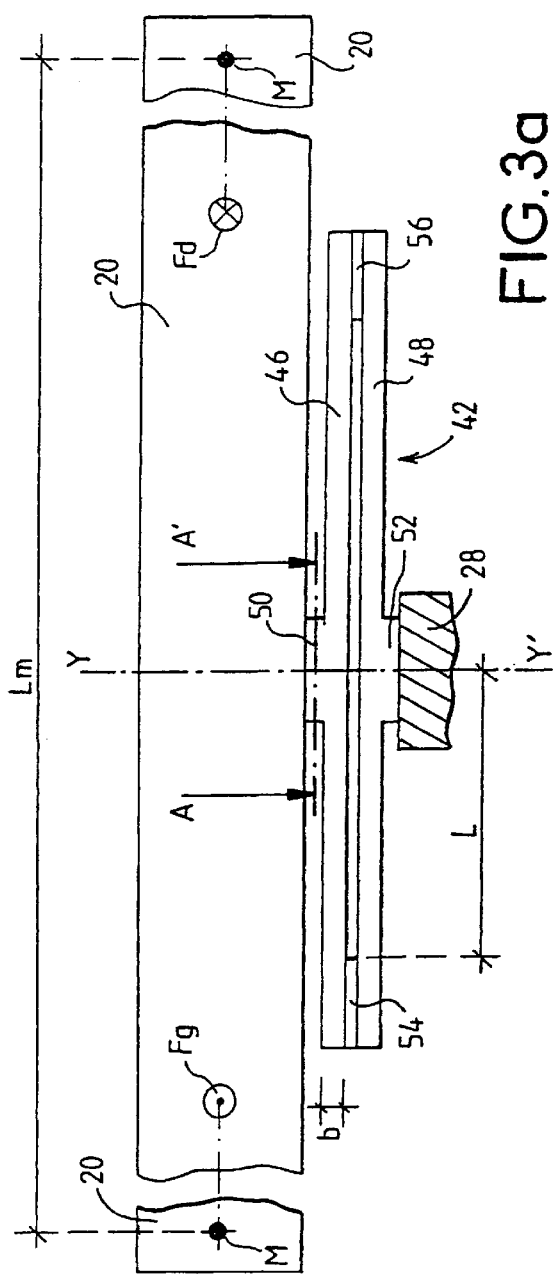
FIG. 3a shows a partial view of the sensitive element of the gyrometer in FIG. 2.

FIG. 3a shows an enlarged partial view of the sensitive element 40 of the gyrometer according to the invention, showing the first return element 42.

The first transverse element 20 is attached to the first elongated beam 46 of the first elastic return element 42 by a first rigid element 50 located along the sensitive axis YY' at a central part of this first elongated beam 46. The second elongated beam of the same return element 42 is attached to the first frame 28 through a second rigid element 52 located on the YY' axis at the central part of the second elongated beam 48. The two ends located on the same side of the two elongated beams are attached through a third rigid element 54 and a fourth rigid element 56 respectively.

Figure 3B:
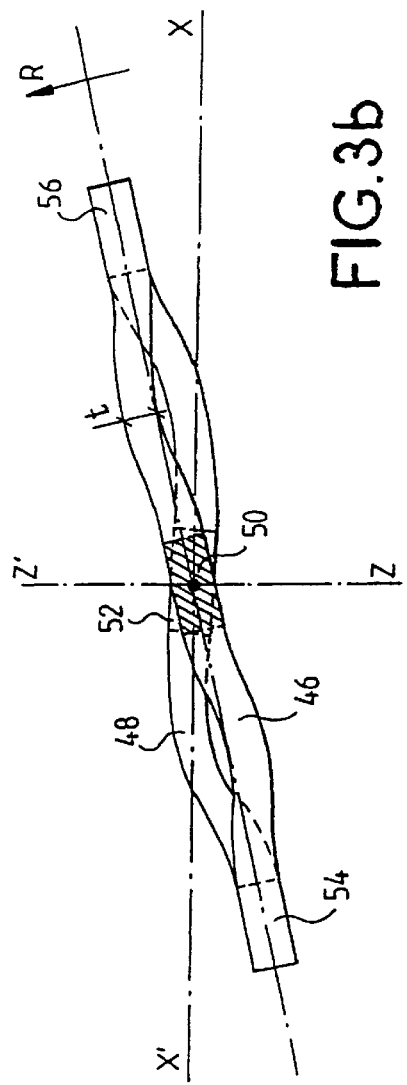

FIG. 3b shows a top view along AA' of the return element 42 in FIG. 3a during a rotation R around the YY' axis in the transverse element driven by a pair of forces Fg and Fd applied on this element.

Rotation of the transverse element 20 about the sensitive axis YY' causes deformations in S by bending of the first elongated beam 46 and the second elongated beam 48, the first elongated beam 46 being driven in rotation by the first rigid element 50 fixed to the first transverse element 20 and the second elongated beam 48 being driven in rotation by the third rigid element 54 and the fourth rigid element 56 fixed to the ends of these two elongated beams 46 and 48. The bending forces and deformations in these elongated beams created by the rotation of the transverse element 20 are related through Young's modulus.

In the same way (see FIG. 2) the second transverse element 22 is attached to the first elongated beam 46 through the first rigid element 50 located in the sensitive axis YY' at the central part of the first elongated beam 46, the second elongated beam 48 being attached to the second frame 30 to the second rigid element 52 located in the YY' sensitive axis at the central part of the second elongated beam 48. The two ends located on the same side of the elongated beams are attached through the third rigid element 54 and the fourth rigid element 56, respectively.

The elastic return elements 42 and 44 must be correctly sized in order to obtain the required effect, either a rotation about a given axis (YY' sensitive axis) preferred over the other movements and mainly causing bending movements. This is done by making the rigid elements 50, 52, 54, 56 with torsion axes parallel to the sensitive axis TT', very stiffen and consequently very short along the YY' axis and wide along the perpendicular XX' and ZZ' axes. The elongated beams 46 and 48 can then be sized to determine a rotation stiffness. The length of these beams elongated in a direction perpendicular to the YY' sensitive axis must also be chosen to give priority to rotation about the YY' axis rather than bending about the ZZ' axis perpendicular to the beams and the YY' axis of rotation.

The rotation stiffness Kt about the YY' axis, calculated for the first embodiment of the return element in FIG. 3a and assuming that the rigid elements 50, 52, 54, 56 are very stiff compared with the elongated beams, is expressed as follows:

$$Kt1 = 2.E. \ I/L$$

Where $I = b.t^3/12$;

E: Young's modulus;

L: half-length of beams 42, 44;

b: dimension of beams parallel to the YY' axis;

t: dimension of beams parallel to the ZZ' axis.

In order to limit the bending movement about the ZZ' axis, the natural frequency of this mode $f_z$ about ZZ' must be greater than the natural frequency in torsion $f_t$. The half-length of the beams determines the ratio between these two frequencies.

If it is assumed that point masses M are placed at the ends of a transverse element (see FIG. 3a) with length Lm, and that the mass of this transverse element is negligible, and that the rigid elements 50, 52, 54, 56 are very stiff compared with the elongated beams, the relation between the length of the transverse element supporting these masses, the length of the beams in the return element and the natural frequencies of the torsion and bending modes about ZZ' are given by:

$$L = (f_t/f_z).Lm. \ \sqrt{3}$$

Figure 4:
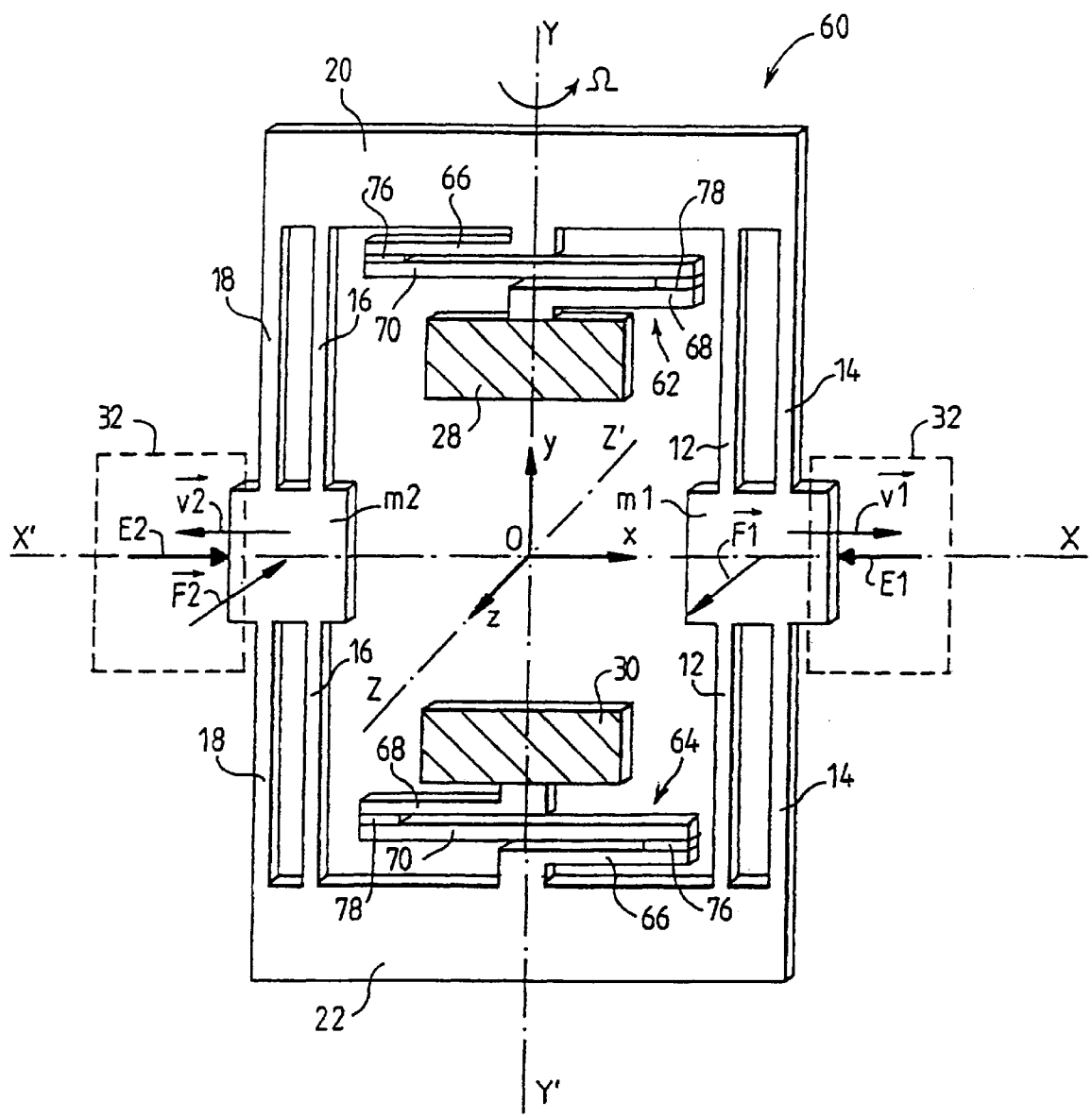
FIG. 4 shows a second embodiment of the sensitive element of a diapason gyrometer according to the invention.

FIG. 4 shows another embodiment of a sensitive element 60 of a gyrometer according to the invention with the same symmetric double beam structure as the sensitive elements 10, 40 FIGS. 1 and 2.

In this other embodiment, the first transverse element 20 and the second transverse element 22 are attached to a first elastic return element 62 and a second elastic return element 64 respectively. Each return element comprises three beams elongated in a direction perpendicular to the YY' sensitive axis, a first elongated beam 66 being attached at one of its ends to a transverse element, a second elongated beam 68 being attached at one of its ends to a frame and a third elongated beam 70 being attached at one of its two ends to the other end of the first elongated beam 66 and at the other end to the other end of the second elongated beam 68.

Figure 5A:
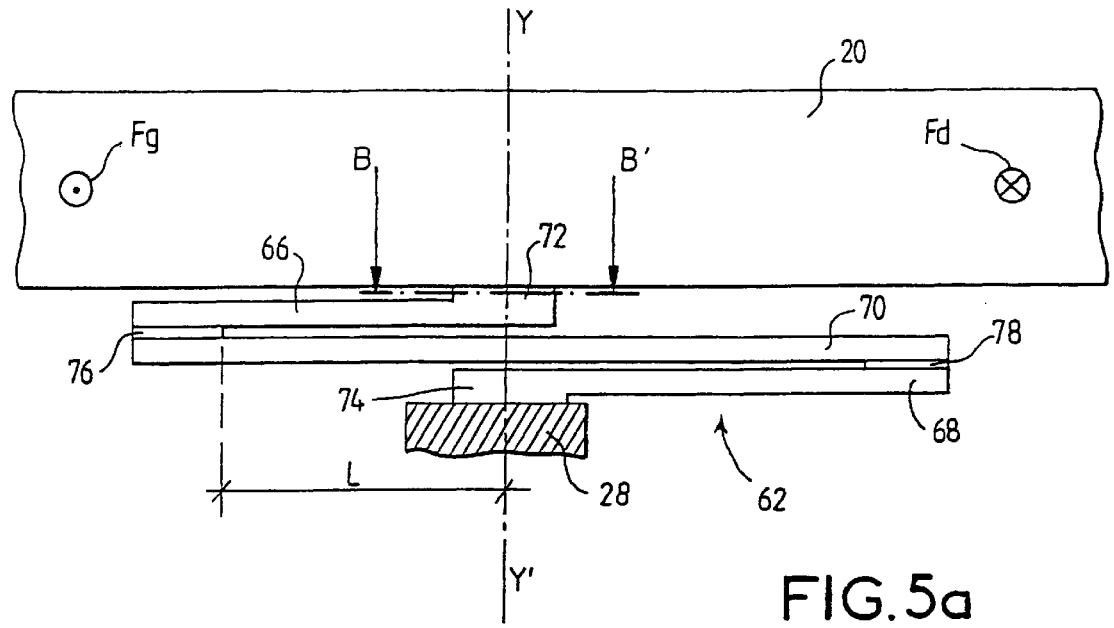
FIG. 5a shows a partial view of the sensitive element of the gyrometer in FIG. 4.

FIG. 5a shows a partial enlarged view of the sensitive element 60 of the gyrometer according to the invention showing the first elastic return element 62.

The first transverse element 20 is attached to one of the ends of the first elongated beam 66 through a first rigid element 72 located in the YY' sensitive axis of the sensitive element 60. The second elongated beam 68 is attached by one of its ends to the first frame 28 through a second rigid element 74 located in the YY' sensitive axis. The third elongated beam 70 is attached through its two ends through a third rigid element 76 to the other end of the first elongated beam 72 and through a fourth rigid element 78 to the other end of the second elongated beam 68.

Figure 5B:
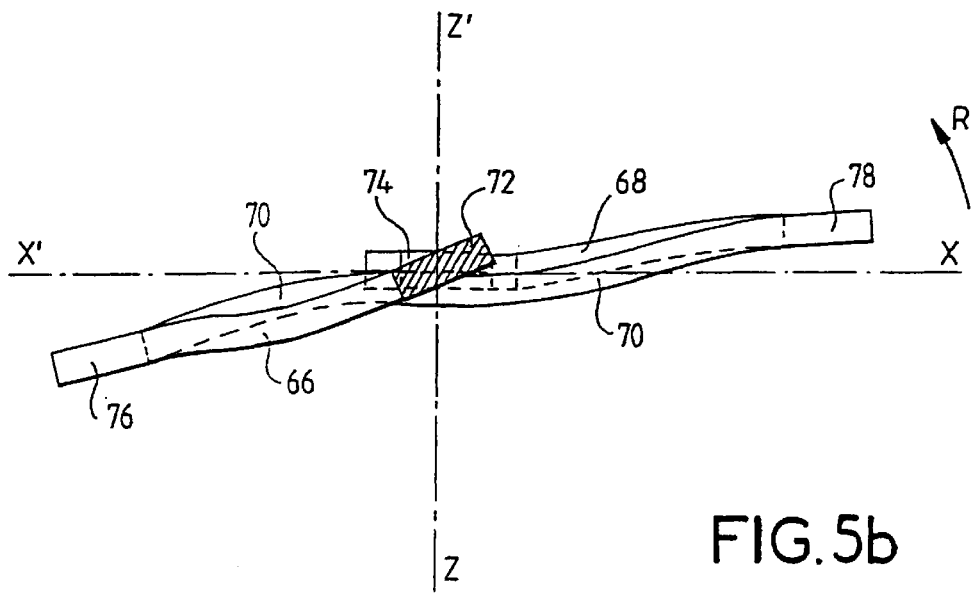

FIG. 5b shows a top view along BB' of the machined micro-mechanical return element 62 in FIG. 5a during rotation R around the sensitive axis YY', of the mobile element 20 driven by the pair of forces Fg and Fd applied to this element. Rotation of the first transverse element 20 about the YY' axis causes a deformation in S by bending of the first elongated beam 66, the second elongated beam 68 and the third elongated beam 70. The first elongated beam 66 is driven in rotation and is deflected by the first rigid element 72 rigidly attached to the first transverse element 20, the movement of this first elongated beam in turn causing a rotation in bending of the third elongated beam 70 and the second elongated beam 68, through the third rigid element 76 and fourth rigid elements 78 respectively.

Similarly, (see FIG. 4) the second transverse element 22 is attached to one of the ends of the first elongated beam 66 of the second elastic return element 64, through the first rigid element 72 located in the YY' axis of the return element, the second elongated beam 68 being attached through one of its ends to the second frame 30 through the second rigid element 72 located in the YY' sensitive axis. The third elongated beam 70 is attached at its two ends through the third rigid element 76 to the other end of the first elongated beam 72, and through the fourth rigid element 78 to the other end of the second elongated beam 68.

As in the case of the first embodiment in FIG. 2, the rotation movement about the sensitive axis YY' of the transverse elements 20, 22 creates bending deformations of the three elongated beams of the return element, the stiffness of which is related to the Young's modulus.

In this second embodiment of the sensitive element in FIG. 4, the rotation stiffness is given by:

$$Kt2=E.I/3.L$$

In gyrometers according to the invention, the return element creates a sort of decoupling by transmitting the rotation of the transverse element through rigid beams parallel to the YY' sensitive axis to flexible beams perpendicular to this axis. Rotation thus causes bending of beams perpendicular to the sensitive axis whereas beams parallel to the sensitive axis are more rigid, and are affected by only a small amount of torsion. This return element thus gives priority to rotation compared with other movements.

In the case of machined micro-mechanical systems such as the sensitive element in FIG. 1, the rotating masses may be carried by high stiffness lever arms in order to limit deflection movements of masses by bending of these arms. The return element itself may be designed to be stiffer in translation movements than for the required rotation. Thus, in the embodiments described with reference to FIGS. 3a, 3b, 4a and 4b, the elongated beams are attached through rigid elements that have very little torsion.

The stiffness of these rigid elements may be a result of their dimensions. These rigid elements are wider and shorter beams than the elongated beams.

Figure 6:
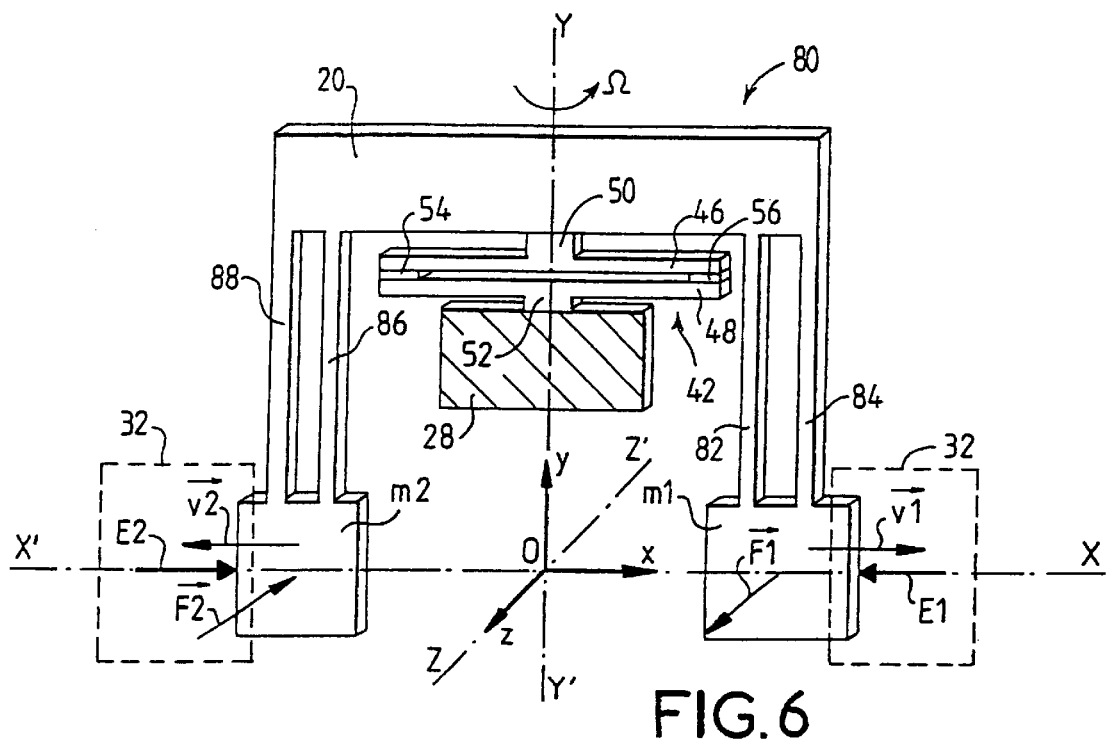
FIGS. 6 and 7 show two simplified embodiments of the diapason gyrometer according to the invention, for which the sensitive element comprises a single transverse element.
Figure 7:
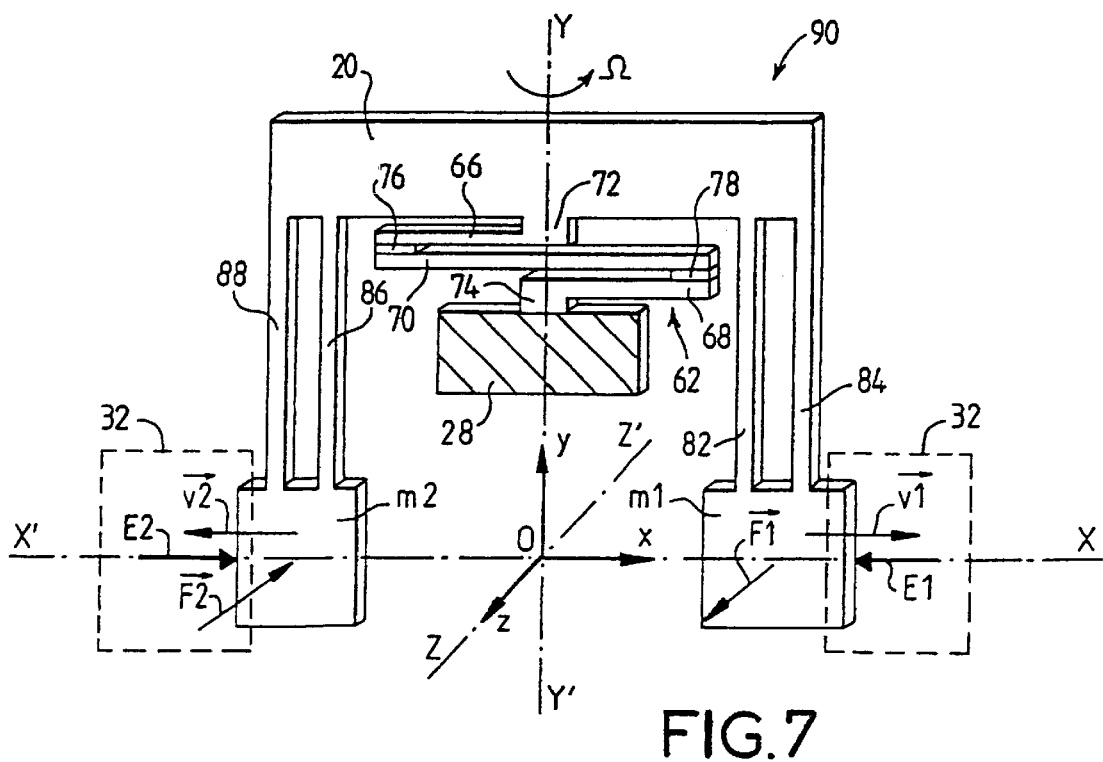

In simplified embodiments of the diapason gyrometer according to the invention, the sensitive elements 80 and 90 shown in FIGS. 6 and 7 respectively comprise a single transverse element.

The structure of the sensitive element 80 in FIG. 6 is the same as the structure of the top part of the sensitive element 40 in FIG. 2 located only on the side of the XX' axis comprising the first transverse element 20. A first pair of excitation beams 82 and 84 and a second pair of excitation beams 86 and 88 are fixed at their ends located on the same side through the sole first transverse element, the other ends of the first and second pair of beams being connected to masses m1 and m2 respectively. The sensitive element 80 comprises the sole elastic return element 42 connecting a central part of the first transverse element 20 to the frame 28.

Similarly, the structure of the sensitive element 90 in FIG. 7 is the same as the structure of the upper part of the sensitive element 60 in FIG. 4 located on the one side of the XX' axis comprising the first transverse element 20. The first pair of excitation beams 82 and 84 and the second pair of excitation beams 86 and 88 are fixed at their ends located on the same side through the sole first transverse element 20, the other ends of the first and second pair of beams being connected to masses m1 and m2 respectively. The sensitive element 90 comprises the sole elastic return element 62 connecting a central part of the first transverse element 20 to the frame 28.

In other variant embodiments of the diapason gyrometer according to the invention, the sensitive element comprises two excitation beams located on each side of the sensitive axis YY' connected at their ends on the same side through the first transverse element 20 and the second transverse element 22 respectively.

The elastic return elements shown in FIGS. 3a and 5a may be cascaded, which gives a greater rotation amplitude of the resulting return element.

Figure 8:
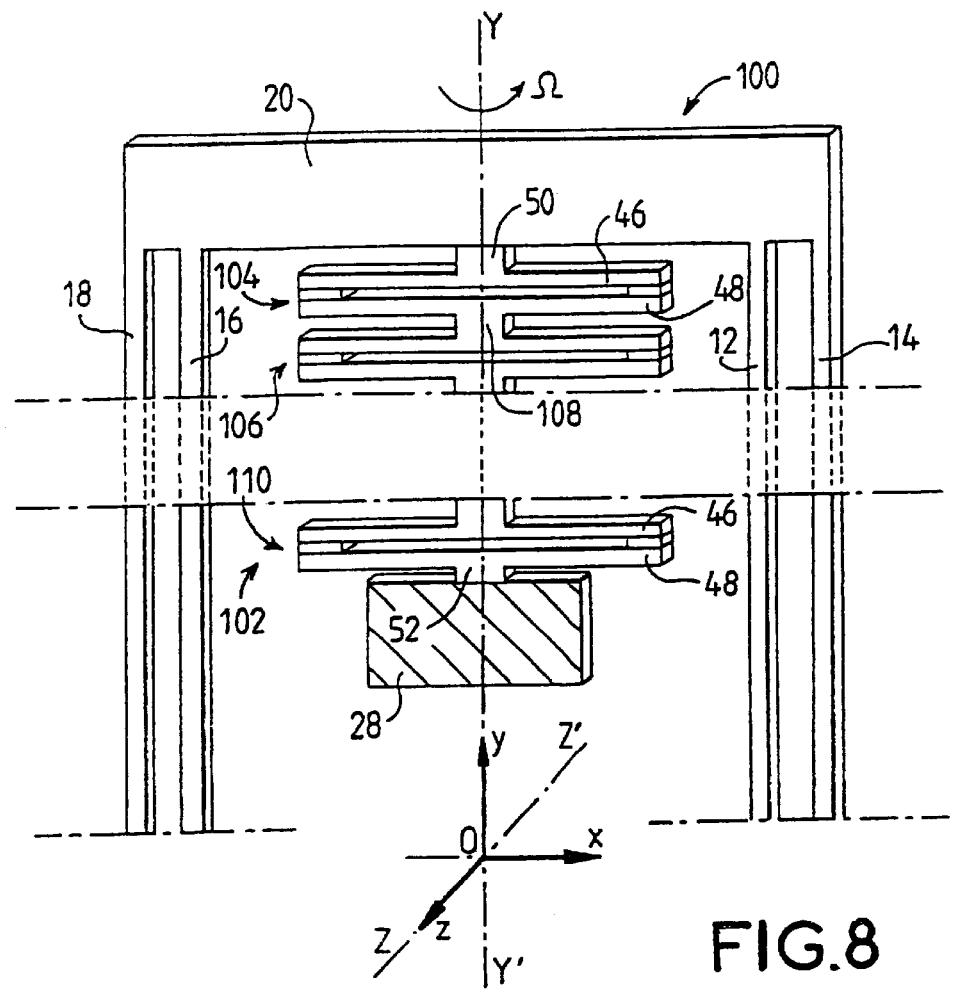
FIG. 8 shows a partial view of a sensitive element of a gyrometer according to the invention, comprising a cascade of return elements.

FIG. 8 shows a partial view of a sensitive element 100 with the same double beam structure as the sensitive element 40 in FIG. 2. The sensitive element 100 comprises a cascade 102 of return elements, each of the elastic return elements being as shown in FIG. 3a, comprising two elongated beams 46, 48. The first transverse element 20, and the first frame 28 are connected through a cascade 102 of elastic return elements, a first return element 104 being connected to the first transverse element 20 of the sensitive element 100 through the first rigid element 50, a next elastic return element 106 being connected to the first elastic return element 104 through an intermediate rigid element 108, and so on until a last elastic return element 110 connected to the frame 28 through a second rigid element 52.

In another embodiment of the gyrometer, the cascade of return elements in the sensitive element may be made using return elements 72 in FIG. 5a comprising three elongated beams 66, 68, 70.

In other variant embodiments of the sensitive element of the diapason gyrometer, the elastic return element (42, 44, 62, 64) is attached firstly to the transverse element (20, 22) through a first pair of small beams 120, 122 and secondly to the frame (28,30) through a second pair of small beams 124, 126 with dimensions along the sensitive axis YY' and along the XX' axis that are very small compared with the length of the elongated beams, the two small beams in one pair being located close to and on each side of the sensitive axis YY'.

Figure 9:
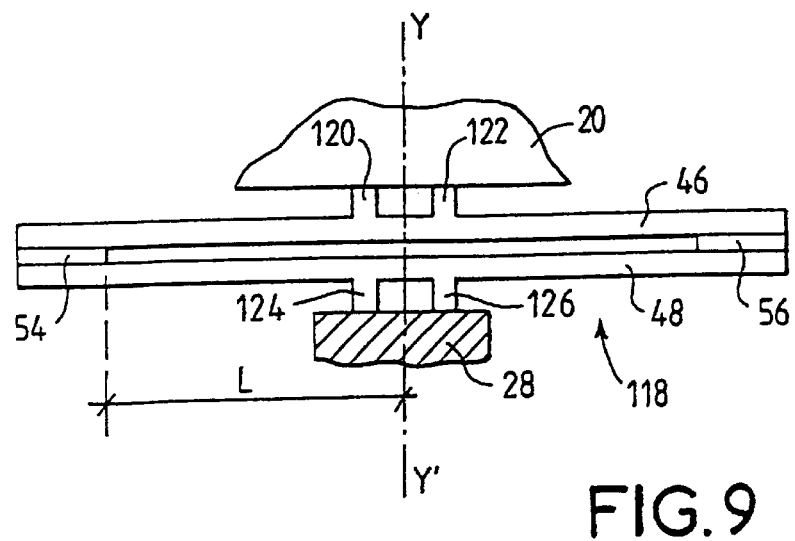
FIG. 9 shows a partial view of a sensitive element around attachments comprising small beams.

FIG. 9 shows a partial view of a sensitive element around the attachments of a first elastic return element 118 with the same structure as the elastic return element 42 shown in FIG. 3a comprising the first pair of small beams 120 and 122 and the second pair of small beams 124 and 126. These small beams further facilitate bending compared with torsion of the sensitive element.

Gyrometers according to the state of the art can give measurement precisions for the angular velocity of the order of 1 degree per second.

The invention makes it possible to superpose the two resonance modes of the sensitive element of a diapason gyrometer precisely during manufacture, and then in operation particularly during thermal fluctuations.

Therefore the gyrometer according to the invention has a better signal to noise ratio and a better thermal stability. Therefore, it can achieve measurement precisions of angular velocities of the order of ten times greater than what is possible with gyrometers according to prior art.

What is claimed is:

1. A gyrometer, comprising:

a micro-machined sensitive element with at least two symmetrically positioned excitation beams on each side of and parallel to a sensitive Oy axis of the gyrometer, excited in bending about an Ox axis perpendicular to the sensitive Oy axis, and connected at their ends through at least one transverse element fixed in its central part to the sensitive Oy axis, to a frame through an elastic torsion return element acting in opposition to rotation of the transverse element about the Oy axis, wherein the elastic return element is sized such that a variation of its resonant natural frequency in torsion with temperature is similar to a variation of a resonant natural frequency in bending of the beams with temperature.

2. The gyrometer according to claim 1, wherein the elastic return element of a transverse element comprises at least one beam elongated in a direction perpendicular to the Oy axis such that the torsion return force due to this elastic return element is essentially due to the resistance of this elongated beam to bending.

3. The gyrometer according to claim 2, wherein the elastic return element comprises two elongated beams approximately parallel to each other and attached to each other at their ends on a same side, a central part of one of the beams being attached to the transverse element and a central part of the other beam being attached to a central part of the frame.

4. The gyrometer according to claim 2, wherein the elastic return element comprises first, second and third approximately parallel elongated beams, a first beam attached through one of its end to the transverse element, a second beam attached through one of its ends to the frame, and a third beam attached through one of its ends to the other end of the first beam and through its other end to the other end of the second beam.

5. The gyrometer according to claim 2, wherein the micro-machined sensitive element of the gyrometer comprises a first pair of two first excitation beams and a second pair of two second excitation beams, the excitation beams in the first and second pairs being located in a same Oxy plane of a reference coordinate system and parallel to a sensitive axis YY' coincident with the Oy axis, the first and second pairs being located on each side and at approximately equal distances from the YY' axis, each pair of excitation beams comprising a central mass connecting the two beams in a pair at their mid point, a mass m1 at a middle of the first pair and a mass m2 at a middle of the second pair, the ends of the excitation beams located on the same side being connected to a first transverse element and to a second transverse element respectively located in the same Oxy plane of the excitation beams and approximately perpendicular to these beams, the first transverse element and the second transverse elements being attached to a first elastic torsion return element and to a second elastic torsion return element respectively.

6. The gyrometer according to claim 5, wherein each of the elastic return elements comprises a first elongated beam and a second elongated beam along a direction perpendicular to the sensitive axis TT', the first elongated beam being attached to a transverse element and the second elongated beam being attached to a frame, the first and second elongated beams being attached to each other through their ends on a same side.

7. The gyrometer according to claim 6, wherein the first transverse element is attached to the first elongated beam of the first elastic return element by a first rigid element located along the sensitive axis YY' at a central part of this first elongated beam, the second elongated beam of the same elastic return element being attached to a first frame through a second rigid element located on the YY' axis at the central part of the second elongated beam, the two ends located on a same side of the two elongated beams are attached through a third rigid element and a fourth rigid element respectively, and in that the second transverse element is attached to the first elongated beam through the first rigid element located in the YY' sensitive axis at the central part of the first elongated beam, the second elongated beam being attached to a second frame through the second rigid element located in the YY' sensitive axis at the central part of the second elongated beam, the two ends on the same side of the elongated beams being attached through the third rigid element, and the fourth rigid element respectively.

8. The gyrometer according to claim 5, wherein each elastic return element comprises first, second, and third beams elongated in a direction perpendicular to the YY' sensitive axis, a first elongated beam being attached at one of its ends to a transverse element, a second elongated beam being attached at one of its ends to a frame, and a third elongated beam being attached at one of its two ends to the other end of the first elongated beam and at the other end to the other end of the second elongated beam.

9. The gyrometer according to claim 8, wherein the first transverse element is attached to a first end of the first elongated beam through the first elastic return element through a first rigid element located in the YY' sensitive axis of the sensitive element, the second elongated beam being attached by one of its ends to the first frame through a second rigid element located in the YY' sensitive axis, the third elongated beam being attached at its two ends through a third rigid element to the other end of the first elongated beam and through a fourth rigid element to the other end of the second elongated beam, and in that the second transverse element is attached to one of the ends of the first elongated beam of the second elastic return element, through the first rigid element located in the YY' axis of the second return element, the second elongated beam being attached through one of its ends to the second frame through the second rigid element located in the YY' sensitive axis, the third elongated beam being attached at its two ends through the third rigid element to the other end of the first elongated beam, and through the fourth rigid element to the other end of the second elongated beam.

10. The gyrometer according to claim 3, wherein the elongated beams are short in the direction of the Oy sensitive axis to have strong resistance to torsion.

11. The gyrometer according to claim 7, wherein the rigid elements are wider and shorter beams than the elongated beams.

12. The gyrometer according to claim 2, wherein the micro-machined sensitive element comprises a first pair of excitation beams and a second pair of excitation beams, these excitation beams being fixed at their ends located on a same side on a first transverse element, the other ends of the first and second pair of excitation beams being connected to masses m1 and m2 respectively, the micro-machined sensitive element comprising the only elastic return element connecting a central part of the first transverse element to a first frame.

13. The gyrometer according to claim 2, wherein the transverse element and the frame are connected through a cascade of elastic return elements, a first elastic return element being connected to the first transverse element of the sensitive element through a first rigid element, a next elastic return element being connected to the first elastic return element through an intermediate rigid element, and so on until a last elastic return element is connected to the frame through a second rigid element.

14. The gyrometer according to claim 2, wherein the elastic return element is attached firstly to the transverse element through a first pair of small beams and secondly to the frame through a second pair of small beams along the sensitive axis YY' and along the XX' axis with dimensions that are very small compared with a length of the elongated beams, the two small beams in one of the first pair and the second pair being located close to and on each side of the sensitive axis YY'.

* * * * *